United States Patent Office 3,391,059
Patented July 2, 1968

3,391,059
PROCESS FOR PRODUCING
L-ASPARTIC ACID
Yoshichika Takamura, Tokyo, Iwao Kitamura, Yokohama, and Kageaki Kono and Asaichiro Ozaki, Tokyo, Japan, assignors to Sanraku-Ocean Kabushiki Kaisha
No Drawing. Filed Feb. 15, 1965, Ser. No. 432,865
Claims priority, application Japan, Feb. 19, 1964, 39/8,608; June 2, 1964, 39/30,883
7 Claims. (Cl. 195—30)

ABSTRACT OF THE DISCLOSURE

Aspartic acid is prepared from maleic acid and ammonia by enzymes obtained by (1) culturing microorganisms (having the ability to convert maleic acid into aspartic acid) in a medium containing maleic or malonic acids whereby enzymes are produced and (2) adding the enzymes thus produced to a solution containing maleic acid and a source of ammonium to form aspartic acid.

The present invention relates to a process of producing L-aspartic acid enzymatically from maleic acid and ammonia by utilizing microbes.

More specifically, it relates to an enzymatic process of producing L-aspartic acid from maleic acid and sources of ammonium ions by means of enzyme systems which act as a catalyst for the conversion of maleate to L-aspartic acid. These enzyme systems are obtained from the culture broth of various microbes in a medium containing maleic acid and/or malonic acid. These microbes may be isolated according to the procedure described herein.

The traditional method of producing L-aspartic acid has been the enzymatic one of producing it from fumaric acid and ammonia or an ammonium salt, utilizing the aspartase activity of microbes. Meanwhile, the present inventors have discovered a new process for obtaining L-aspartic acid from maleic acid, which can be synthetically produced at low cost in great quantities, and have succeeded in utilizing the process on an industrial scale.

A detailed account of this process follows.

For this process, any microbe, be it bacterium, fungus, or yeast, may be available. Among them, the strains which possess very strongly the ability to change maleic acid into L-aspartic acid are selected for this purpose. The microbes meeting this requirement are widely distributed in nature and there is no definite limitation of genus or species, but they are chosen easily on the basis of the physiological characteristic mentioned above. There is no taxonomical relation between these microbes and their abilities.

These microbes may be isolated from nature by conventional methods so long as maleic acid is used as the main carbon source in an isolation medium. A preferred isolating method will now be described:

5 ml. of a solution consisting of 0.1 to 0.2% potassium dihydrogen phosphate, 0.05% magnesium sulfate, and 1 to 2% ammonium maleate, having a pH of 6.5 to 6.8 is sterilized in test tubes. About 0.1 g. each of sample soil, trash, dust, or sewage are added, and the test tubes are kept standing at 30° C. for 3 days. Subsequently, 0.005 to 0.01 ml. of the supernatant solution is taken from a test tube, spotted on filter paper, and developed with a solvent of n-butanol:acetic acid:distilled water in a ratio of 4:1:2, and the spots are detected by ninhydrin reaction. The sample having a marked L-aspartic acid reaction is inoculated on a bouillon agar and isolated in a conventional manner.

The microbes thus isolated are further inoculated in 4 ml. of a liquid medium consisting of maleic acid and/or malonic acid, 0.2% potassium didhydrogen phosphate, 0.05% magnesium sulfate, 2% glucose, 0.1% corn steep liquor and 1% ammonium chloride, and incubated at 30° C. on shaker.

After 24 hours, 1 ml. of a 10% ammonium maleate solution is added into the broth; and after 48 more hours' incubation, the amounts of L-aspartic acid produced are evaluated by paper chromatography. Of course, the ability to produce L-aspartic acid from maleic acid varies with each microbe, but any microbes which are proved to possess such ability by the method mentioned above are suitable for use in carrying out this invention.

As the result of painstaking investigations by the present inventors, a large number of microbes have been found available for the efficient practice of this invention. If they are classified according to Bergey's Manual of Determinative Bacteriology, Seventh edition, they fall into genus Alcaligenes, genus Pseudomonas, genus Achromobacter, genus Aerobacter, genus Bacillus, genus Brevibacterium and genus Escherichia. But it should be noted that not all of the microbes under these genii are suitable for practicing this invention; some are lacking entirely in enzymatic activity and others have a very weak activity. Some microbes having high yields are as follows:

*Alcaligenes faecalis*
*Pseudomonas ovalis*
*Pseudomonas aeruginosa*
*Pseudomonas fluorescens*
*Aerobacter aerogenes*
*Escherichia coli*
*Brevibacterium guale*
*Brevibacterium vitarumen*
*Achromobacter liquenfaciens*
*Bacillus brevis*

Some of these microbes gradually lose their enzymatic activity after being isolated from nature and kept standing for some time or in the process of successive cultivation, but in accordance with the above-mentioned method, new strains can be isolated when they are needed.

Next, the method of obtaining the culture broth employed as enzyme source will be described. The medium for this purpose consists of the following: Sugars, such as glucose, fructose, sucrose and maltose; starchy materials, such as starch hydrolysate; organic acids such as citric acid, pyruvic acid, fumaric acid, succinic acid, malic acid, maleic acid and others as carbon sources; inorganic ammonium salts such as $(NH_4)_2SO_4$, $NH_4NO_3$, $NH_4Cl$ and $(NH_2)_2CO$; organic substances such as corn steep liquor, mixed solutions of amino acids, meat extract, peptone, yeast extract as nitrogen sources; inorganic salts such as magnesium sulfate, potassium phosphate as minerals. The most suitable composition should be chosen depending on the properties of the particular microbes to be used, because there are some microbes such as *Alcaligenes faecalis* which do not assimilate sugars and grow only on organic acids or on organic substances.

In trying to obtain an enzyme system having powerful activity from the culture broth, the inventors have discovered that this effect can be obtained only through the cultivation of said microbes in a medium containing maleic acid and/or malonic acid. This fact has been confirmed in experiments using mediums comprising various other organic acids. Some of these experiments are cited below.

EXPERIMENTAL EXAMPLE 1.—EFFECT OF VARIOUS ORGANIC ACIDS ON THE FORMATION OF ENZYMATIC ACTIVITY

| Organic acid added, 1%: | Yield of L-Asp. from maleate (percent) w./w. |
|---|---|
| No addition | 5.64 |
| Maleic acid | 72.7 |
| Fumaric acid | 11.0 |
| Pyruvic acid | 6.6 |
| Citric acid | 5.7 |
| Methyl maleic acid | 6.0 |
| Malic acid | 13.6 |
| Malonic acid | 108.5 |
| Acetic acid | 0 |
| Methyl fumaric acid | 5.8 |
| Succinic acid | 11.5 |
| Oxalic acid | 9.4 |

Microbe—*Alcaligenes faecalis* 5–24
Medium composition:
  Corn steep liquor 1%
  "Mieki" (trade name for soybean hydrolysate containing various amino acids expressed as 3% of nitrogen)
  $KH_2PO_4$ 0.1%
  $MgSO_4 \cdot 7H_2O$ 0.05%
Reacting conditions:
  After cultivation of *Alcaligenes faecalis* 5–24, the cells are harvested by centrifuging and suspended in water having one-tenth the volume of the original broth. With one part of this suspension, one part of 20% maleic acid solution (neutralized to pH 7.2 with ammonia water) and a small amount of xylene are mixed and allowed to incubate together at 30° C. for 66 hours without agitation. Then, the yield of L-aspartic acid is evaluated by microbial bioassay.

EXPERIMENTAL EXAMPLE 2.—EFFECT OF MALONIC AND MALEIC ACID ADDITIONS ON THE YIELD OF L-ASPARTIC ACID

| Additive | Concentration, percent | Yield of L-aspartic acid (percent) w./w. | |
|---|---|---|---|
| | | 24 hr. reaction | 48 hr. reaction |
| No addition | | 5.2 | 5.9 |
| Maleic acid | 0.3 | 21 | 35 |
| Do | 0.6 | 35 | 54 |
| Do | 1 | 58 | 75 |
| Malonic acid | 0.2 | 35 | 50 |
| Do | 0.3 | 57 | 69 |
| Do | 0.5 | 95.5 | 98.5 |
| Do | 0.6 | 97 | 99 |
| Do | 0.8 | 99 | 106 |
| Maleic acid | 0.3 | 86 | 98 |
| Plus malonic acid | 0.3 | | |

The microbe used, the composition of the culture medium, and the reacting conditions were, aside from the acid, the same as in Example 1.

As seen from Examples 1 and 2, the substances which are effective for enhancing enzymatic activity are maleic acid and/or malonic acid, the amount added being 0.1 to 10% of the medium or more desirably 0.5 to 1.0%. No theoretical explanation has been established for the effect obtained as described above by adding maleic acid and/or malonic acid to the medium, but it is presumed that maleic acid acts not only as the carbon source for the microbe but also as an inducer for the formation of the enzyme system, while malonic acid cannot be employed as the carbon source, but only as the inducer. Particularly, the inducible effect of malonic acid is remarkable. For example, when the cells harvested from a medium to which 1% malonic acid has been added are utilized as the enzyme source, L-aspartic acid will be obtained from maleic acid in the amount of nearly 100% of the theoretical value.

The maleic acid and/or malonic acid should preferably be added before inoculation or at the beginning of cultivation. Subsequent addition of these acids may of course be permitted, but the total addition of maleic acid and/or malonic acid before the growth of microbes gives the best results. The cultivation is carried out at a nearly neutral pH value, at 25° to 37° C., under aerobic conditions.

The duration of cultivation differs somewhat depending upon the microbe employed, but it is usual to terminate the cultivation in about 48 hours at most. The entire culture broth thus cultured may be used as the enzyme source, or one may use the cells harvested by centrifugation or filtration to make a cell suspension. Suspensions of broken cells, ground cells or their autolysates and enzyme preparations thereof may also be employed, as the above cells may be lysed by conventional methods, including sonic vibration, grinding with abrasive material or treatment with an organic solvent such as toluene or ethyl acetate. These enzyme sources are mixed with a maleic acid solution, which is previously neutralized with ammonia, and kept standing still to react at about from 15 to 40° C., at near neutral pH value. The pH range during the reaction is from 6.5 to 8.5, preferably from 7 to 7.5, with occasional steady agitation, but aeration and contact with air should be minimized. The concentration of maleic acid in the reaction mixture is usually 5 to 20%, but a higher concentration may be employed for some microbes. The reaction can be started with the concentration mentioned above or with a relatively low concentration which is supplemented by subsequent feeding of maleic acid (neutralized with ammonia) according to the amount of maleic acid consumed. The latter sometimes gives good results. The reaction is usually terminated in 1 to 4 days and thereafter the L-aspartic acid produced can be recovered by the conventional method.

Some practical examples follow:

Example 1

A medium consisting of 1% corn steep liquor, 2% "Mieki" (as hereinbefore defined), 0.1% $KH_2PO_4$, 0.05% $MgSO_4 \cdot 7H_2O$, 0.3% maleic acid and 0.5% malonic acid (neutralized by NaOH to pH 6.2) in the amount of 3 l. was placed in a 5 l.-capacity small jarfermenter, this solution was sterilized and a strain of *Alcaligenes faecalis* 5–24 isolated according to the procedure hereinbefore described was inoculated therein and cultured for 16 hours under agitation and aeration. After cultivation, the cells were harvested and suspended in 1 l. of distilled water, yielding an enzyme source.

A mixture of 1 l. of said solution with 1 l. of 20% maleic acid (neutralized previously with ammonia to pH 7.2) and 40 ml. of toluene was prepared and left standing still at 30° C. for 24 hours to react. After the reaction, the cells were removed by centrifuging and the supernatant liquid was adjusted with hydrochloric acid to pH 2.7. Then crystals of L-aspartic acid were separated; the yield of crude crystals amounted to 185.5 g.

Example 2

A medium similar to the one employed in Example 1 in the amount of 3 l. was placed in a 5 l. capacity jarfermenter. After sterilization, a strain of Achromobacter liquenfaciens, isolated from mud, according to the procedure described above, was inoculated thereon and cultivated under agitation and aeration for 18 hours. The culture broth in the amount of 2.5 l. was taken as the enzyme source, and after 2.5 l. of an aqueous solution of 20% maleic acid (neutralized by ammonia to pH 7.2) and 100 ml. of toluene had been successively added, was left standing still at 30° C. for 48 hours to react. The supernatant liquid after removal of cells was adjusted to pH 2.7 with hydrochloric acid, left in a refrigerator (+2° C.) overnight and crude crystals of L-aspartic acid in the amount of 285 g. could be obtained.

Example 3

Ten liters of a medium composed of 1% corn steep liquor, 3% "Mieki" (as hereinbefore defined), 0.1% $KH_2PO_4$, 0.05% $MgSO_4 \cdot 7H_2O$, 0.3% maleic acid and 0.3% malonic acid was charged into a 20 l. fermenter tank, and after sterilization, was inoculated with a strain of *Aerobacter aerogenes* isolated by the inventors' procedure. After 24 hours cultivation, aeration and agitation, the cells were collected by centrifugation and suspended in 5 l. of water. This suspension was used as an enzyme source and mixed with 5 l. of 20% maleic acid (neutralized with ammonia water to pH 7.2) and 150 ml. of toluene. The resulting mixture was left standing still at 30° C. for 24 hours to react. After the reaction, the cells were removed and the pH of the supernatant solution was adjusted to pH 2.7 with concentrated hydrochloric acid and then chilled in a refrigerator while crystals of L-aspartic acid matured. As the result, 960 g. of crude crystals of L-aspartic acid was obtained.

Example 4

Three liters of a medium (at pH 6.2) composed of 0.4% malonic acid, 0.2% ammonium chloride, 1% succinic acid, 0.2% corn steep liquor, 0.1% $KH_2PO_4$, 0.05% $MgSO_4 \cdot 7H_2O$, 2 p.p.m. $Fe^{++}$, $Mn^{++}$ contained in a 5 l. capacity fermenting tank, being sterilized, was inoculated with a strain of *Pseudomonas ovalis* isolated as described above, and cultured aerobically for 24 hours. 1 l. of 40% maleic acid which had been adjusted to pH 7.2 with ammonia was added to the broth thus obtained and was left to react, standing at 25° C. for 60 hours with occasional gentle agitation. After cell removal, by adjusting to pH 2.7, the isoelectric point of L-aspartic acid, crude crystals of L-aspartic acid amounting to 315 g. were obtained.

Example 5

Ten liters of a medium composed of starch hydrolysate solution (5% expressed as glucose), 0.5% corn steep liquor, 1% yeast extract, 0.1% $KH_2PO_4$, 0.05% $MgSO_4 \cdot 7H_2O$, and 0.8% malonic acid was placed in a 20 l. fermenting tank and after sterilization, was inoculated with a strain of *Bacillus brevis* isolated as described above, and cultivated under aeration for 36 hours. Thereafter, the cells were collected by centrifugation and suspended in water. The suspension was added to 5 l. of 20% maleic acid (adjusted to pH 7.0 with ammonia) and left standing to react at 28° C. for 48 hours. After reaction, the cells were removed and, after adjusting to the isoelectric point, 920 g. crude crystals of L-aspartic acid were obtained.

Example 6

In the same method as in Example 1, a strain of *Brevibacterium ammoniagenes* was cultivated and through a reaction similar to that in Example 1, 180 g. crude crystals of L-aspartic acid were obtained.

What is claimed is:
1. The method of producing L-aspartic acid enzymatically which comprises the steps of cultivating in a nutrient culture medium comprising a constituent selected from the group consisting of maleic acid, malonic acid, and mixtures of said maleic and malonic acids at least one microbe which has the ability to convert maleic acid into L-aspartic acid and adding an enzyme selected from those enzymes thus produced to a solution containing maleic acid and a source of ammonium to form L-aspartic acid.

2. The method claimed in claim 1 according to which said culture comprises from 0.1% to 10% of said selected constituent.

3. The method claimed in claim 1 according to which said culture medium comprises from 0.5% to 1.0% of said selected constituent.

4. The method claimed in claim 3 according to which the pH of said liquid is between 6.5 and 8.5.

5. The method claimed in claim 4 according to which said mixture is maintained at a temperature of between 15° and 40° C. while said L-aspartic acid is being formed.

6. The method claimed in claim 1 in which said at least one microbe is selected from the group consisting of:

Genuses:
  Pseudomonas,
  Alcaligenes,
  Aerobacter,
  Bacillus,
  Brevibacterium, and
  Escherichia.

7. The method claimed in claim 1 in which said at least one microbe is selected from the group consisting of:

*Alcaligenes faecalis,*
*Pseudomonas ovalis,*
*Pseudomonas aeruginosa,*
*Pseudomonas fluorescens,*
*Aerobacter aerogenes,*
*Escherichia coli,*
*Brevibacterium quale,*
*Brevibacterium vitarumen,*
*Achromobacter liquenfaciens,* and
*Bacillus brevis.*

References Cited

UNITED STATES PATENTS 3,058,888  10/1962  Chibata et al. _____ 195—29

FOREIGN PATENTS 382,793  3/1963  Japan.
382,794  3/1963  Japan.

LIONEL M. SHAPIRO, *Primary Examiner.*

A. LOUIS MONACELL, *Examiner.*